US005988458A

United States Patent [19]

Messner

[11] Patent Number: 5,988,458

[45] Date of Patent: Nov. 23, 1999

[54] SPILL INHIBITING SPOUT

[75] Inventor: Marvin Messner, Stanberry, Mo.

[73] Assignee: No-Spill Research, Inc., Stanbury, Mo.

[21] Appl. No.: 09/056,372

[22] Filed: Apr. 7, 1998

[51] Int. Cl.[6] .............................. B67D 3/00; F16K 24/00

[52] U.S. Cl. ....................... 222/478; 222/481.5; 222/488; 222/529; 137/583; 137/588

[58] Field of Search ................................ 222/478, 481.5, 222/488, 479, 529; 137/81.1, 583, 587, 588

[56] References Cited

U.S. PATENT DOCUMENTS

| | | | |
|---|---|---|---|
| 2,197,352 | 4/1940 | Terkel | 222/488 |
| 3,913,611 | 10/1975 | St. John | 222/479 |
| 4,722,463 | 2/1988 | Anderson | 222/481.5 |
| 4,746,036 | 5/1988 | Messner . | |
| 4,834,270 | 5/1989 | Messner . | |
| 5,042,698 | 8/1991 | Fessell | 222/481.5 |

OTHER PUBLICATIONS

Briggs & Stratton Smart–Fill Fuel Can (product information).

SurePour Nozzle (product information).

Arnold Wonder–Fil mini–spout adapter (product information).

Spill Saver Gas Can On/Off Spout (product information).

Carry–Safe Flow pouring spout (product information).

No–Spill Gas Can (photograph).

*Primary Examiner*—Joseph A. Kaufman
*Assistant Examiner*—Keats Quinalty
*Attorney, Agent, or Firm*—Hovey, Williams, Timmons & Collins

[57] ABSTRACT

A spout for mounting on a liquid container to provide controlled dispensing of liquid therefrom includes a manual control for stopping the flow of liquid through a pouring tube and an automatic control to prevent spills due to overfilling. Manual control over the amount of liquid flowing through the pouring opening of the spout is provided by a preferably tubular rod having a stop mounted at one end and a push button actuator at the other end of the rod. The spout includes a body with the pouring tube extending from one side and the push button for opening the stop to dispense liquid on the other side of the body. The automatic control is provided through a vent tube which extends through a port in the pouring tube and is connected to the tubular rod which is provided with at least one hole. When the level of liquid in a receiving tank rises over the port, no air enters the liquid container and consequently the flow of liquid from the pouring tube is discontinued.

20 Claims, 2 Drawing Sheets

Fig. 1.
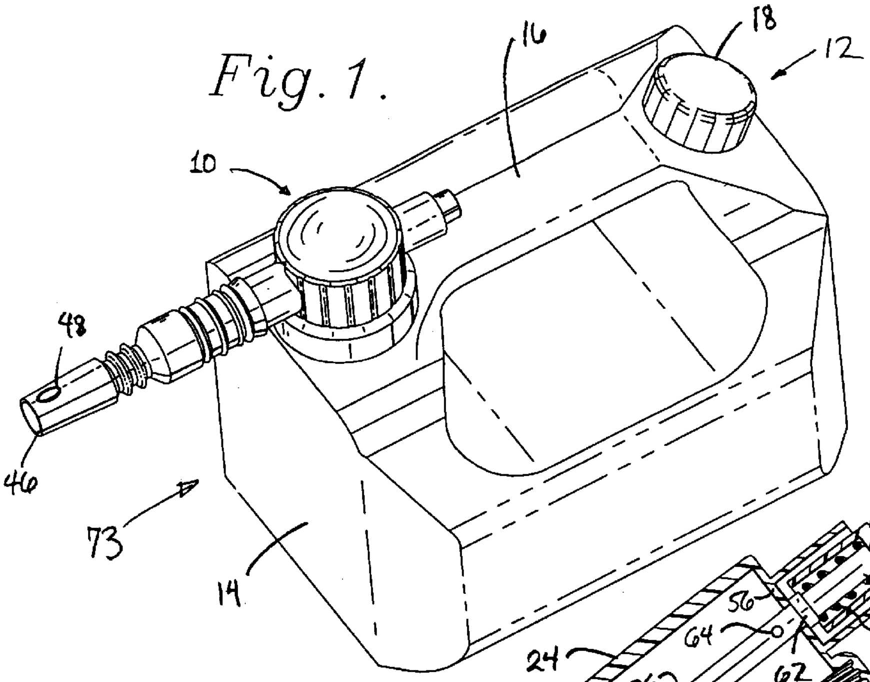
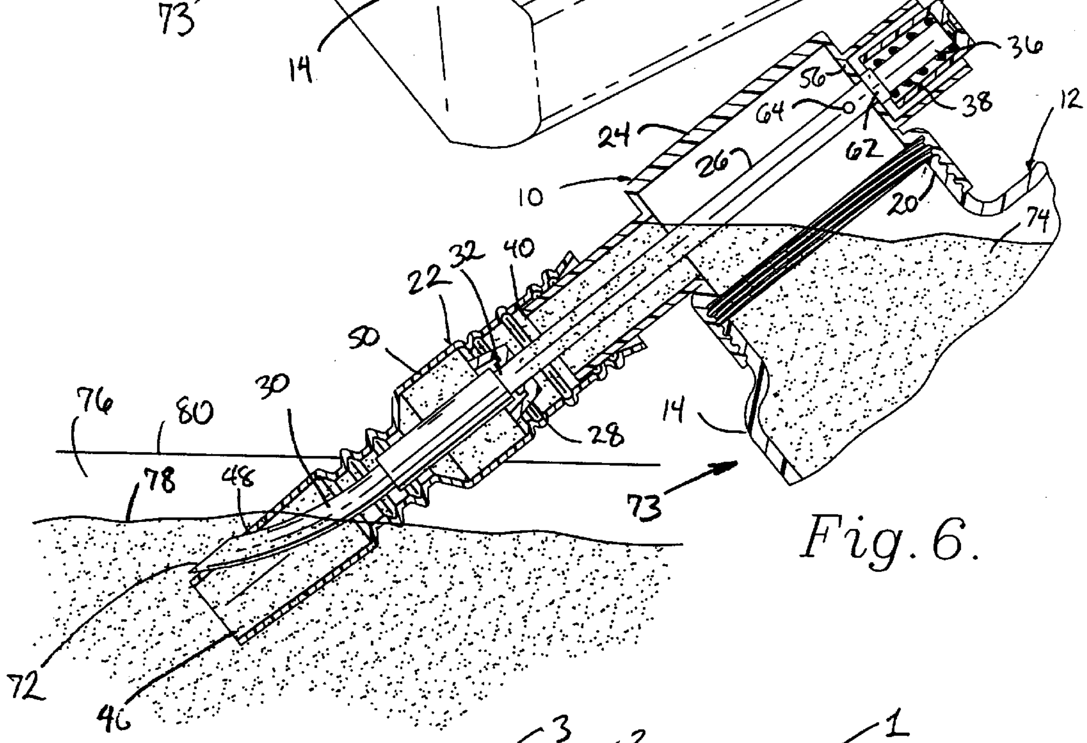
Fig. 6.
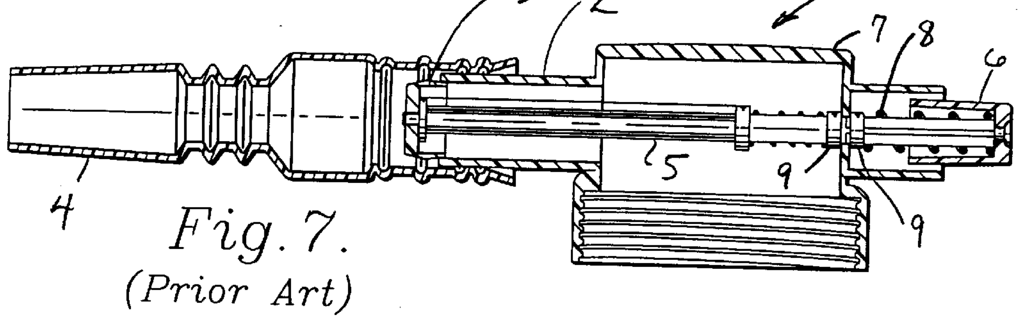
Fig. 7.
(Prior Art)

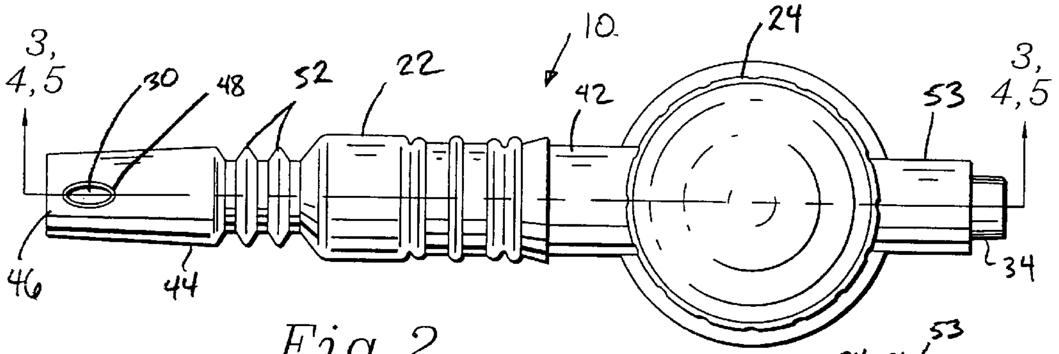
Fig. 2.
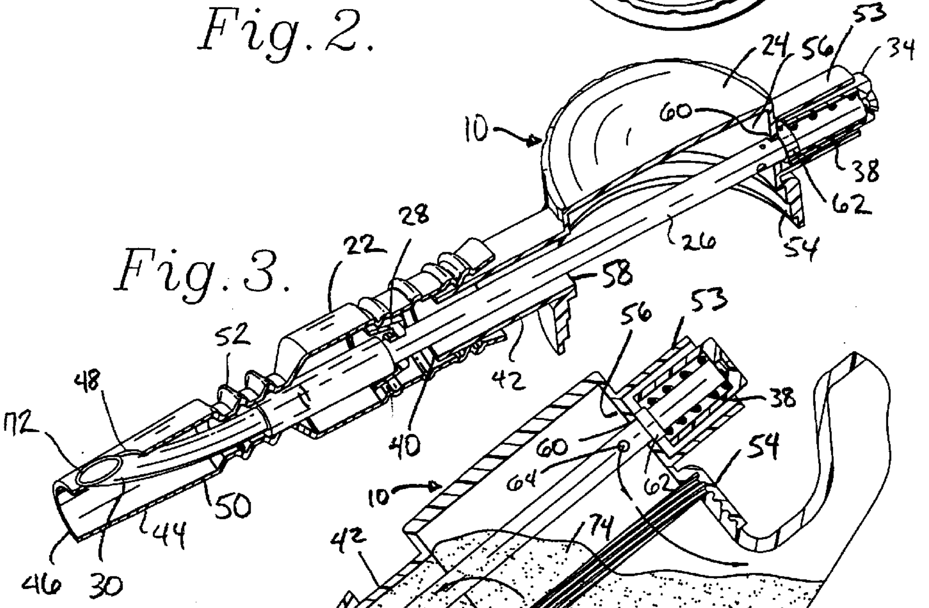
Fig. 3.
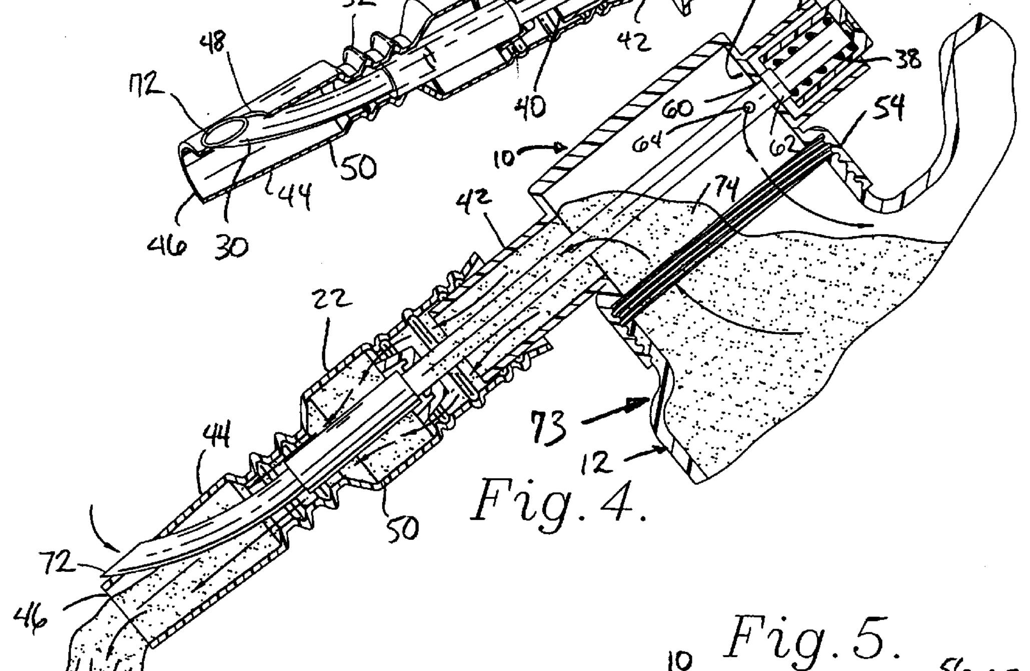
Fig. 4.
Fig. 5.
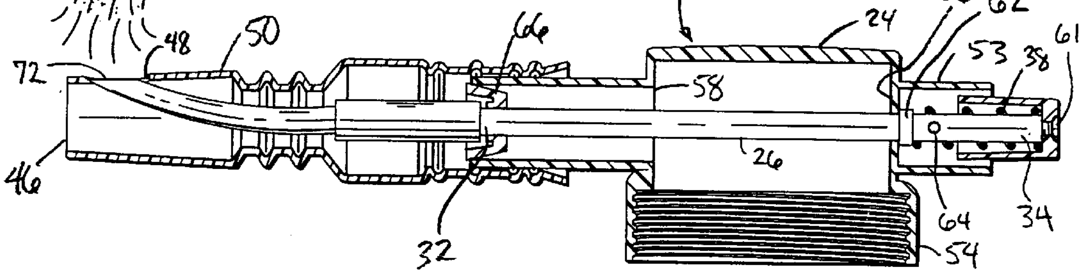

SPILL INHIBITING SPOUT

BACKGROUND OF THE INVENTION

1. Field of the Invention

This invention concerns a spout for use with a liquid container to provide a liquid dispenser, such as a gasoline jug, and which inhibits spillage of liquid due to overflow of the liquid during filing of a receiving tank. More particularly, it concerns a spout which may be readily attached to a liquid container and is manually controllable as well as automatically inhibiting overflow by cutting off the inflow of air once the receiving tank is filled.

2. Description of the Prior Art

While conventional pour spouts are available and in use by consumers for dispensing petroleum products such as oil and kerosene into gasoline tanks of lawn mowers and similar equipment, increasing attention is being focused on the use of spouts which inhibit spillage. Areas with air pollution problems are looking for ways to reduce to release of volatile organic compounds (VOCs) into the atmosphere. When a container, such as a gasoline jug, is used to pour gasoline into the fuel tank of an engine, it is common for the user to overfill the tank. The spilled fuel represents not only a fire hazard and may damage plant life, but also represents an undesired source for the release of organic vapors which pollute the atmosphere.

One partial solution is shown in my previous U.S. Pat. Nos. 4,746,036 and 4,834,270. These patents show an example of the use of a remotely operated spout where the operator can virtually instantaneously stop the flow of liquid from a tank. This same concept is shown in the separate spout shown in the drawings and labeled "prior art". This spout is currently offered on a fuel jug sold by No-Spill Research, Inc. of Stanbury, Mo., and features a push-button operated closure with a detachable extension on the spout. The spout permits the user to simply release the button and stop the flow of fuel. However, in the event the user inadvertently keeps the button depressed after the receiving tank is filled, air can continue to flow into the fuel jug adjacent the button, and fuel thereby continues to flow into the tank.

Other attempts to solve this problem have resulted in spouts which are difficult to operate. In one case, a spout is actuated by shifting a spring-loaded exterior sleeve engageable with the rim of the receiving tank relative to the remainder of the spout and the fuel jug. The force required to overcome the spring is cumbersome and difficult to control, and the application of force may cause the receiving tank or jug to tip and spill the contents. In addition, a preferred spout will resist the escape of vapors during periods of storage. There has thus arisen the need for a simple and effective pouring spout which inhibits spillage, both by limiting the entry of air once the receiving tank is filled and also by providing a manual control to shut off the flow of liquid.

SUMMARY OF THE INVENTION

These and other objects have largely been met by the spill inhibiting spout of the present invention. That is to say, the spout hereof provides both a manual control and a vent control to inhibit undesired overflow of the dispensed liquid from a receiver. The manual control is advantageously spring biased to the closed position and permits one handed operation by the user without the need for shifting the entire spout. The vent control effectively shuts off the flow of air into the spout when the level of liquid in the receiver rises to cover the air intake port. When the spout is fixed in sealing relationship with the container to which it is mounted, the inability to introduce air into the container to replace the volume of the dispensed liquid causes a partial vacuum therein. This in turn slows or stops the flow of liquid out of the spout.

The spout air intake is located on a sidewall of the pouring tube and directs a return flow of air into the container when the manual button is depressed and liquid flows from the spout. Advantageously, the intake port communicates the air into the container through a vent tube and then to a tubular rod which also actuates the stop. The holes which allow the air to move from the rod into the container are located inside the body of the spout only when the discharge button is depressed. This largely prevents dangerous and undesirable venting of fumes when the stop is in the closed position, as there is no outlet for the passage of fumes to the atmosphere. The tubular rod mounts the stop and a conduit at one end and spring and the button adjacent the ports on the other end. The stop is preferably frustoconical in configuration to promote laminar flow of the liquid and provide good sealing engagement with an internal annular seat or rim within the pouring tube.

The spout hereof can be used with virtually any liquid, can be sized for mounting on containers of various sizes and is easily controlled. The operation of the pouring spout is greatly simplified in comparison to other vent limiting spouts, in that the user can simply tip the dispenser, i.e. the container and spout, so that the pouring tube and its air intake port are located in the receiving tank. By depressing the button positioned opposite the pouring tube, liquid is dispensed past the stop, and releasing the button causes corresponding cessation of liquid flow. If the button is retained in a depressed position until the liquid level in the tank rises to a level covering the air intake port on the pouring tube, a partial vacuum is formed within the dispensing container and liquid slows and then stops flowing from the pouring tube.

These and other advantages will be readily apparent to those skilled in the art with reference to the following drawings and description of the preferred embodiment shown therein.

BRIEF DESCRIPTION OF THE DRAWINGS

FIG. 1 is a top right front perspective view showing the spill-inhibiting spout hereof mounted on a liquid container;

FIG. 2 is a top plan view of the spout;

FIG. 3 is a vertical sectional view in perspective along line 3—3 of FIG. 2, showing the flow release button in a depressed or actuated position;

FIG. 4 is a fragmentary vertical cross-sectional view along line 4—4 of FIG. 2, showing the spout hereof mounted on a liquid container with arrows illustrating the liquid flow and return ventilation of gas into the container with the tubular rod shifting the stop to a first flow permitting position;

FIG. 5 is a vertical cross-sectional view of the spout taken along line 5—5 of FIG. 2, showing the flow release button in the extended position to shift the rod and the stop carried thereby to a second position inhibiting the flow of liquid through the pouring spout and past the stop;

FIG. 6 is a fragmentary vertical cross-sectional view similar to FIG. 4, showing the pouring tube inserted beneath the liquid level of a receiving tank so that the spout air intake is beneath the surface, thereby inhibiting the further discharge of liquid from the spout; and FIG. 7 is a vertical cross-sectional view similar to FIG. 5 of a prior art spout.

DESCRIPTION OF THE PREFERRED EMBODIMENT

Referring now to the drawings, FIG. 7 illustrates a prior art spout 1 adapted for coupling to a liquid container by threaded attachment, chemical bonding or heat sealing. The spout 1 as shown includes a pouring tube 2 with a stop 3 for preventing liquid flow. An extension 4 is frictionally fitted over the pouring tube 2. The stop 3 is carried by a solid shiftable rod 5 connected to a button 6 and carried by a body 7. Spring 8 biases the button 6 and therefore the rod 5 and stop 3 to a closed position. By pressing on the button 6, the rod 5 shifts within the pouring tube 2 so that the stop is shifted away from its flow inhibiting position illustrated. Air enters the spout 1 between the body 7 and the rod 5 to replace the volume within the container vacated by the dispensed liquid. Seals 9 surround the rod 5 and are held in position by a seal spring to inhibit the escape of fumes from the spout 1 when the stop 3 is in the closed position, but no provision is made for limiting intake of air from either the pouring tube 2 or the extension 3 when liquid is being dispensed therefrom.

FIGS. 1 through 6 illustrate my new spill-inhibiting spout 10 in accordance with the present invention. As shown in FIG. 1, the spout 10 hereof is designed to be mounted on a liquid container 12 presenting a hollow reservoir 14, a graspable handle 16, and a filler cap 18 threadably mounted on the handle 16 to permit filling of the reservoir 14 without the need to remove the spout 10. The container 12 may be of metal, polyethylene or other suitably strong and leak-resistant material. The spout 10 may be screwed on to a threaded neck 20, as shown in FIGS. 4 and 6, or alternatively chemically bonded or heat welded onto a smooth neck to ensure proper alignment of the spout 10 relative to the container 12.

As shown in FIGS. 2 through 6, spout 10 broadly includes a pouring tube 22, a body 24, a tubular rod 26 mounting an annular stop 28 and a vent intake tube 30 at one end 32 and carrying a button 34 at the other end 36. A spring 38 is positioned between the body 24 and the button 34, thereby biasing the rod 26 toward the button 34 and the stop 28 into seating engagement with a seat 40 on the pouring tube 22.

In greater detail, pouring tube 22 may be provided as a single tubular extension from body 24, or as shown in the embodiment illustrated in the drawings, as a pipe 42 integrally formed with and extending from body 24 and a detachable, flexible extension 44 frictionally fitted over the pipe 42. The pouring tube 22 includes a pouring opening 46 at the remote end thereof, and a port 48 defined in sidewall 50 of pouring tube 22. The pouring tube 22 is preferably, though not necessarily, provided with corrugations 52 upstream from port 48 to provide flexibility for the pouring tube 22 and thereby permit the orientation of the pouring opening 46 to be changed. The annular seat 40 is preferably integrally formed with pouring tube 22 as a raised ridge to sealingly engage the stop 28 when seated thereagainst.

Body 24 is substantially cylindrical about an upright axis, carrying pouring tube 22 and a button receiver 53 in opposed relationship located along a common normally horizontal axis as illustrated in FIG. 5. The body 24 includes an internally threaded collar 54 configured for mounting on neck 20, or alternatively the collar may be smooth for chemical bonding or welding to the neck or lugged for bayonet mounting, or other mounting relationship to permit the spout 10 to be attached to the neck 20 to avoid liquid leakage. The body 24 also includes a circular wall 56 presenting an opening 58 into pouring tube 22 and an opposed access 60 for the passage of tubular rod 26 therethrough. The access 60 is sized just large enough to accommodate rod 26 therethrough and thus not only acts a bushing supporting the rod 26 during shifting of the latter, but also as a seal to inhibit the undesired escape of liquid or vapors between the rod 26 and the body 24.

Tubular rod 26 is shiftably carried by the body 24 for reciprocating movement initiated by button 34 mounted to rod 26 by snap fitting, threads, or, as shown in the drawings, a set screw 61. The rod 26 presents one end 32 and other end 36 which is internally threaded to receive set screw 60. An O-ring 62 is mounted on tubular rod 26 and is located between button 34 and opening 58, the O-ring being biased in sealing relationship against access 60 by spring 38. Tubular rod 26 also presents at least one and preferably a plurality of holes 64 which are located on the exterior of the wall 56 when the button 34 is free and the stop 28 is resting against seat 40 as shown in FIG. 5, but which are located on the interior of the wall 56 when the button 34 is depressed and the stop 28 is unseated as shown in FIGS. 4 and 6.

The holes 64 fluidically communicate through a tubular channel within and extending the length of tubular rod 26 to vent intake tube 30 mounted on the one end 32 into the interior of the body 24 and thus fluidically communicate with the hollow interior of the liquid container 12. Stop 28 is also mounted on tubular rod 26 at one end 32. The stop 28 is preferably fixed by threading onto rod 26, adhesive, or other means whereby the stop is prevented from shifting along the rod 26. The stop 28 also preferably presents a frustoconical outer surface 66 to preferably cause the flow of liquid therepast to be more laminar and also to facilitate seating of the stop 28. The stop 28 may be of low-density polyethylene or a resilient, petroleum resistant synthetic resin material such as neoprene to further promote sealing. The tubular rod 26 extends forwardly from stop 28 into pouring tube 22 to receive a sleeve 68 of intake tube 30 thereon. Intake tube 30 also includes a curved portion 70 which is preferably of a flexible tubular synthetic resin material and provided with a diagonally cut end 72 to lie flush with the exterior of the pouring tube 22 and within port 48. The flexibility of the curved portion 68 facilitates shifting of the tubular rod 26.

The spout 10 hereof is useful in dispensing a variety of liquids, but its features are particularly beneficial in connection with dispensing gasoline, kerosine or other petroleum products because the design inhibits undesired escape of vapors or VOCs. In typical operation, the spout 10 is mounted to container 12 to provide a liquid dispenser 73. The user grasps handle 16 and tilts the container 12 so that the level of the liquid 74 within the container 12 flows through the opening 58 and into the pouring tube 22. When the user is ready to dispense the liquid 74, he pushes against the button 34 with a thumb or finger, thereby shifting the tubular rod 26 and stop 28. This both permits liquid 74 to pass from pouring tube 22 and exposes the holes 62 within the circular wall of the body 24 so that as liquid passes from the spout 10 through pouring opening 46, air is permitted to enter through the vent intake tube 30 and through holes 64 into the interior of the spout 10 and into the container 12 on which the spout 10 is mounted. At any time, the flow of liquid 74 will cease when the user releases the button and the spring 38 returns the button 34 and tubular rod 26 to their initial position shown in FIG. 5, all the while maintaining O-ring 62 in sealing engagement over the access 60 and against the circular wall 56. The rearward shifting of the rod 26 also cause the stop 28 to seal against seat 40 to immediately cut off the flow of liquid past the stop 28.

In the event the user is dispensing the liquid 74 into a tank 76 or other receptacle, the level 78 of the liquid received therein may eventually rise to threaten spillage by overflow. The spout 10 hereof, when properly used, resists this eventuality. When the end 72 of the vent intake tube 30 below the rim 80 of the tank 76, the level 78 of the liquid 74 will rise above the end 72 before the liquid spills over the rim 80 and out of the tank. When the level 78 rises above the end 72 of the vent intake tube projecting through port 48, air is no longer able to enter into the spout 10 nor into the container 12 when the filler cap 18 is securely in place as shown in FIG. 1. A vacuum begins to build within the container, slowing the discharge of liquid through the pouring tube 22 until the flow therethrough virtually stops as shown in FIG. 6. Because the holes 64 are within the interior of the spout 10, no air may enter the container 12. The vacuum thus created is maintained, so that even if the user inadvertently keeps the button 34 open longer than desirable, spillage will be averted provided the end 72 remains beneath the level 78. Upon recognizing that the level 78 is at the maximum desired, the user will then know to release the button 34 to close the stop against its seat prior to lifting the end 72 above the level 78. During storage, vapors are prevented from escaping past the O-ring and the stop 34, and air may pass through the vent tube 30 without entering the interior of the container 12, thereby avoiding undesired escape of volatile fumes.

The construction of the spout 10 hereof thus permits one handed operation and a minimum of parts which can be readily assembled with a small expense, and is easy to use, maintain and store.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example the use of a threaded collar on the spout 10 avoids the necessity for a separate filler cap 18, making the spout 10 hereof useful in connection with bleach bottles or other chemical containers where the liquids, if spilled, may be harmful. A lever or other engagement member could be substituted for the button 34 to shift the rod 26 from a position exterior to the body. Other examples of such modifications include making the tubular rod 26 of brass, synthetic resin or other crush-resistant material and integrally forming the rod 26 with vent tube 30.

The inventor hereby states his intent to rely on the Doctrine of Equivalents to determine and assess the reasonably fair scope of his/their invention as pertains to any apparatus not materially departing from but outside the literal scope of the invention as set out in the following claims.

I claim:

1. A spout adapted for mounting on a liquid container comprising:

a body adapted for mounting to a container;

a pouring tube extending from and fluidically communicating with said body, said pouring tube presenting a pouring opening and a sidewall defining therein a vent port intermediate said body and said pouring opening;

a tubular rod shiftably carried by said body, said rod including at least one hole positionable within the body;

an engagement member coupled to said tubular rod remotely from said pouring tube and extending exteriorly of said body for manually shifting said tubular rod;

a stop carried by said tubular rod and shiftable relative to said pouring tube between a first position permitting liquid flow through said pouring tube and a second position inhibiting flow through said pouring tube; and a vent tube fluidically connecting said tubular rod with the vent port.

2. A spout as set forth in claim 1, said stop being annular and mounted in surrounding relationship to said tubular rod.

3. A spout as set forth in claim 2, wherein said pouring spout includes an annular seat extending radially inwardly for sealing engagement with said stop.

4. A spout as set forth in claim 3, wherein said seat is positioned intermediate said vent port and said body.

5. A spout as set forth in claim 1, wherein said vent tube is shiftably carried by said tubular rod.

6. A spout as set forth in claim 1, wherein said engagement member comprises a button.

7. A spout as set forth in claim 1, including a spring positioned between said engagement member and said body for biasing said stop to said second flow inhibiting position.

8. A spout as set forth in claim 7, wherein said spring is a coil spring positioned in surrounding relationship to said tubular rod.

9. A spout as set forth in claim 8, wherein said body presents an access positioned opposite to said pouring spout for shiftably receiving said tubular rod therethrough, and including a sealing ring carried by said rod and located externally of said body, said spring lying in engagement with said sealing ring for biasing said sealing ring toward said access.

10. A spout as set forth in claim 9, wherein said at least one hole is located in said rod adjacent said access, whereby said hole is located inside said body when said stop is in said first flow permitting position and is located outside said body when said stop is in said second flow inhibiting position.

11. A spout adapted for mounting on a liquid container comprising:

a body including structure for coupling to a container;

a pouring tube extending from the body presenting a pouring opening for dispensing liquid therefrom and a port located between the body and the port opening for permitting entry of air into the container during the discharge of liquid from the pouring opening;

a stop element located within said pouring tube and shiftably carried by said body for translational movement between a first position permitting the flow of liquid from the container through the pouring tube and a second position inhibiting the flow of liquid from the container through the pouring tube;

a shiftable actuating member located relatively opposite the pouring opening of said pouring tube for actuating said stop; and a tubular member fluidically connecting said port with the interior of said body.

12. A spout as set forth in claim 11, said stop element including a rod and a stop mounted on said rod, said rod extending through said body for actuation by said actuating member.

13. A spout as set forth in claim 12, said rod having opposed ends, said stop being located within said pouring tube at one end and said actuating member being mounted to the other end externally of said body.

14. A spout as set forth in claim 13, said rod being tubular and including at least one hole therein opposite said stop, said fluidic connecting member including a vent tube extending into said port.

15. A spout as set forth in claim 14, wherein said hole is positioned to lie within the body when said rod is in said first position and outside the body when said rod is in said second position.

16. A spout as set forth in claim 15, including a spring for biasing said stop means to said second position.

17. A liquid dispenser for limiting spills attributable to overfilling, said dispenser including:

- a hollow container adapted to receive liquid therein and presenting a neck; and
- a spout mounted to said container for dispensing liquid therefrom, said spout including:
  - a body presenting a collar for mounting said spout to said neck;
  - a pouring tube extending from and fluidically connected to said body, said pouring tube including a pouring opening;
  - a vent tube having a vent opening proximate to but separate from said pouring opening and located intermediate said pouring opening and said body, said vent tube being in fluidic communication with the interior of the body;
  - a shiftable member presenting one end and another end extending through said body opposite said pouring tube and axially aligned with said pouring opening of said pouring tube and shiftable relative to said body; and
  - a stop located within said pouring tube and coupled to said shiftable member adjacent said one end for movement therewith between a first position permitting a flow of liquid from said container passed said stop and to said pouring opening and a second position in sealing engagement with said pouring tube for inhibiting the flow of liquid therepast.

18. A liquid dispenser as set forth in claim 17, wherein said stop is positioned within said pouring tube for engagement with an annular seat within said pouring tube.

19. A liquid dispenser as set forth in claim 17, wherein said shiftable member is a tubular rod coupled to said vent tube at said one end and presenting at least one hole proximate said other end, said hole being shiftable between a location inside said body when said stop is in said first position and a location outside said body when said stop is in said second position.

20. A liquid dispenser as set forth in claim 19, including a sealing ring mounted on said rod adjacent said second end and outside said body and a spring for biasing said rod to said second position and for holding said seal against said body.

* * * * *